(12) United States Patent
Faibish et al.

(10) Patent No.: US 9,069,594 B1
(45) Date of Patent: Jun. 30, 2015

(54) BURST BUFFER APPLIANCE COMPRISING MULTIPLE VIRTUAL MACHINES

(71) Applicant: EMC Corporation, Hopkinton, MA (US)

(72) Inventors: Sorin Faibish, Newtown, MA (US); John M. Bent, Los Alamos, NM (US)

(73) Assignee: EMC Corporation, Hopkinton, MA (US)

( * ) Notice: Subject to any disclaimer, the term of this patent is extended or adjusted under 35 U.S.C. 154(b) by 256 days.

(21) Appl. No.: 13/728,421

(22) Filed: Dec. 27, 2012

(51) Int. Cl.
    G06F 13/00 (2006.01)
    G06F 13/36 (2006.01)
    G06F 13/20 (2006.01)
    G06F 9/455 (2006.01)
    G06F 9/46 (2006.01)
    G06F 13/40 (2006.01)

(52) U.S. Cl.
    CPC ............ *G06F 9/45533* (2013.01); *G06F 13/40* (2013.01)

(58) Field of Classification Search
    CPC ............ G06F 9/45533; G06F 9/45558; G06F 9/5077; G06F 2201/815
    USPC .............. 710/104, 306, 313, 314; 718/1, 103, 718/102, 100
    See application file for complete search history.

(56) References Cited

U.S. PATENT DOCUMENTS

| | | | |
|---|---|---|---|
| 6,609,187 B1* | 8/2003 | Merrell et al. | 711/173 |
| 8,462,632 B1* | 6/2013 | Vincent | 370/235 |
| 8,756,599 B2* | 6/2014 | Devarakonda et al. | 718/1 |
| 2006/0064697 A1* | 3/2006 | Kagi et al. | 718/103 |
| 2007/0277175 A1* | 11/2007 | Lutter | 718/102 |
| 2007/0294459 A1* | 12/2007 | Chen | 710/315 |
| 2008/0235487 A1* | 9/2008 | Illikkal et al. | 711/207 |
| 2009/0019442 A1* | 1/2009 | Liu | 718/102 |
| 2009/0055834 A1* | 2/2009 | Ding et al. | 718/104 |
| 2010/0054129 A1* | 3/2010 | Kuik et al. | 370/235 |
| 2010/0122052 A1* | 5/2010 | Waldspurger et al. | 711/162 |
| 2010/0257602 A1* | 10/2010 | Kettler et al. | 726/19 |
| 2011/0004500 A1* | 1/2011 | Nathuji | 705/7 |
| 2011/0007746 A1* | 1/2011 | Mudigonda et al. | 370/395.21 |
| 2011/0022812 A1* | 1/2011 | van der Linden et al. | 711/163 |

(Continued)

FOREIGN PATENT DOCUMENTS

| | | | | | |
|---|---|---|---|---|---|
| CN | 103577265 A | * | 2/2014 | | G06F 9/50 |
| CN | 103810016 A | * | 5/2014 | | G06F 9/455 |

(Continued)

*Primary Examiner* — Faisal M Zaman
(74) *Attorney, Agent, or Firm* — Ryan, Mason & Lewis, LLP

(57) ABSTRACT

A burst buffer appliance is adapted for coupling between a computer system and a file system. The burst buffer appliance comprises a flash memory or other high-speed memory having a substantially lower access time than the file system, and is configured to include a plurality of virtual machines for processing respective different types of input-output operations that involve utilization of the high-speed memory, with each of the virtual machines providing a different performance level for its associated type of input-output operations. The performance levels provided by the plurality of virtual machines may comprise respective different quality of service (QoS) levels for the respective different types of input-output operations, specified in terms of parameters such as latency and throughput rate. A highest QoS level may be provided by a particular virtual machine for operations involving writing checkpoints from the computer system to the high-speed memory.

21 Claims, 3 Drawing Sheets

(56) References Cited

U.S. PATENT DOCUMENTS

| | | | |
|---|---|---|---|
| 2011/0225299 A1* | 9/2011 | Nathuji et al. | 709/226 |
| 2012/0016970 A1* | 1/2012 | Shah et al. | 709/220 |
| 2012/0117567 A1* | 5/2012 | Amano | 718/1 |
| 2012/0240112 A1* | 9/2012 | Nishiguchi et al. | 718/1 |
| 2012/0324035 A1* | 12/2012 | Cantu et al. | 709/213 |
| 2013/0031322 A1* | 1/2013 | Bulusu et al. | 711/162 |
| 2013/0097603 A1* | 4/2013 | Amano et al. | 718/1 |
| 2013/0138836 A1* | 5/2013 | Cohen et al. | 709/250 |
| 2013/0159579 A1* | 6/2013 | Neiger et al. | 710/265 |
| 2013/0160014 A1* | 6/2013 | Watanabe et al. | 718/1 |
| 2013/0227557 A1* | 8/2013 | Pechanec et al. | 718/1 |
| 2013/0232493 A1* | 9/2013 | Kato et al. | 718/1 |
| 2013/0297753 A1* | 11/2013 | Lu | 709/220 |
| 2013/0332927 A1* | 12/2013 | Tang et al. | 718/1 |
| 2014/0007093 A1* | 1/2014 | Deshpande et al. | 718/1 |
| 2014/0123133 A1* | 5/2014 | Luxenberg | 718/1 |
| 2014/0173597 A1* | 6/2014 | Anand et al. | 718/1 |

FOREIGN PATENT DOCUMENTS

| | | | | |
|---|---|---|---|---|
| CN | 103870313 A | * | 6/2014 | G06F 9/455 |
| CN | 103955397 A | * | 7/2014 | G06F 9/455 |
| WO | WO 2012084839 A1 | * | 6/2012 | G06F 11/14 |

* cited by examiner

BURST BUFFER APPLIANCE COMPRISING MULTIPLE VIRTUAL MACHINES

FIELD

The field relates generally to information processing, and more particularly to information processing in high-performance computing environments.

BACKGROUND

High-performance computer systems such as supercomputers typically include large numbers of compute nodes that access a parallel file system, distributed file system or other type of cluster file system. A cluster file system as the term is broadly used herein generally allows multiple client devices to share access to files over a network.

One well-known cluster file system is the Lustre file system. Lustre is a Linux-based high-performance cluster file system utilized for computer clusters ranging in size from small workgroup clusters to large-scale, multi-site clusters. Lustre can readily scale to support tens of thousands of clients, petabytes of storage, and hundreds of gigabytes per second of aggregate input-output (JO) throughput. Due to its high performance and scalability, Lustre is utilized in many supercomputers, as well as other high-performance computing environments, including large enterprise data centers. Other examples of cluster file systems include distributed file systems such as Hadoop Distributed File System (HDFS).

There are a number of significant issues relating to interfacing a high-performance computer system to a cluster file system. For example, it is important to take periodic checkpoints of the high-performance computer system and to store those checkpoints in the cluster file system, so as to facilitate recovery from failures. However, in typical conventional arrangements, a variety of other types of JO operations need to be carried out on a substantially continuous basis between the high-performance computer system and the cluster file system.

It can therefore be difficult to ensure that the desired checkpoints are properly written to the cluster file system in a manner that does not cause undue interference with the other types of JO operations directed to that system. Also, conflicting priorities among the different types of IO operations can cause checkpoints to be dropped before being written to the cluster file system, leading to problems in failure recovery.

SUMMARY

Illustrative embodiments of the present invention provide information processing systems in which a burst buffer appliance is implemented between a supercomputer or other type of high-performance computer system and a parallel file system, distributed file system or other type of cluster file system. The burst buffer appliance comprises a plurality of virtual machines so as to facilitate prioritization of checkpoints as well as coordination of priorities for other types of IO operations.

In one embodiment, a burst buffer appliance is adapted for coupling between a computer system and a file system. As indicated above, the computer system and file system may comprise, for example, a supercomputer and a parallel file system, respectively. The burst buffer appliance comprises a flash memory or other high-speed memory having a substantially lower access time than the file system, and is configured to include a plurality of virtual machines for processing respective different types of IO operations that involve utilization of the high-speed memory, with each of the virtual machines providing a different performance level for its associated type of IO operations.

The performance levels provided by the plurality of virtual machines may comprise respective different quality of service (QoS) levels for the respective different types of IO operations, specified in terms of parameters such as latency and throughput rate.

By way of example, a given one of the plurality of virtual machines may be configured to provide a first performance level for operations involving writing checkpoints from the computer system to the high-speed memory. In such an arrangement, the first performance level may comprise the highest QoS level of the various QoS levels provided by the respective virtual machines.

Other virtual machines of the burst buffer appliance may provide respective different performance levels than the first performance level for operations involving writing sensor data from a sensor network to the high-speed memory, operations involving writing or reading analytic engine data to or from the high-speed memory, and operations involving writing data from the high-speed memory to the file system.

One or more of the illustrative embodiments described herein exhibit enhanced performance relative to conventional arrangements. For example, by providing a virtual machine based burst buffer appliance, designated QoS levels can be independently established for different types of IO operations. As a result, checkpoints of the computer system can be written to the file system via the high-speed memory of the burst buffer appliance in a manner that does not cause undue interference with other types of JO operations, and dropped checkpoints are thereby avoided.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
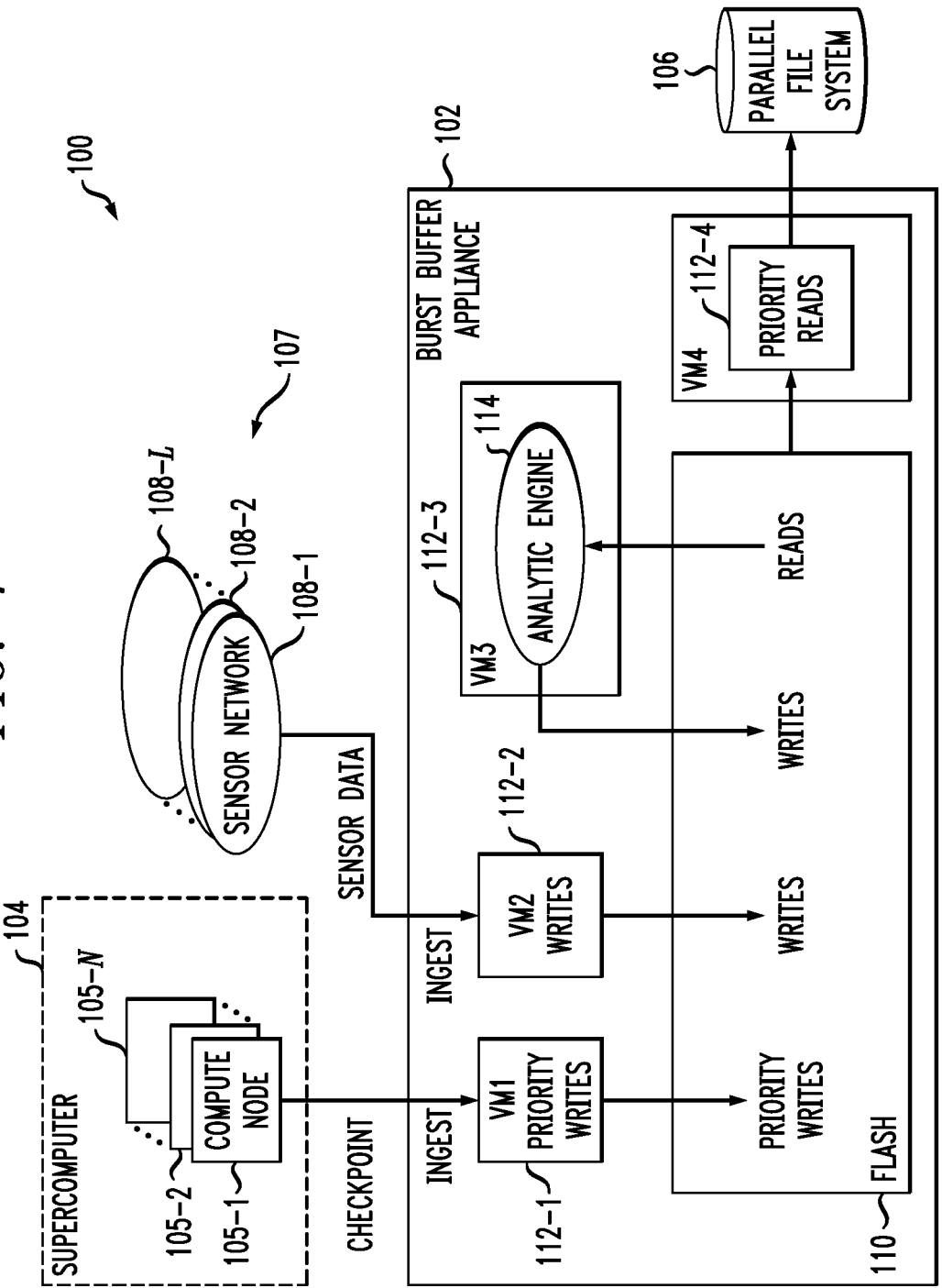
FIG. 1 is a block diagram of an information processing system that includes a virtual machine based burst buffer appliance in an illustrative embodiment of the invention.

FIG. 1 shows an information processing system 100 configured in accordance with an illustrative embodiment of the present invention. The information processing system 100 comprises a burst buffer appliance 102 that is coupled between a supercomputer 104 and a parallel file system 106. The supercomputer 104 comprises a plurality of compute nodes 105-1, 105-2, . . . 105-N, which may be collectively viewed as an example of one possible type of high-performance computer system, or more generally a "computer system," as that term is broadly utilized herein. The parallel file system is an example of what is more generally referred to herein as a "cluster file system." Numerous other types of computer systems and file systems may be used in other embodiments of the invention.

The burst buffer appliance 102 is illustratively shown as being coupled to the first compute node 105-1 of the supercomputer 104 and is used to facilitate the storage of periodic checkpoints for that compute node. The burst buffer appliance 102 may be similarly coupled to one or more of the other compute nodes of the supercomputer 104. Alternatively, each compute node 105 of the supercomputer 104 may have a separate instance of the burst buffer appliance 102 associated therewith, although only a single instance of the burst buffer appliance 102 is shown in FIG. 1 for simplicity and clarity of illustration.

In addition to checkpoint data received from the compute node 105-1, the burst buffer appliance 102 receives data from additional data sources 107. These additional data sources 107 in the present embodiment comprise sensor networks 108-1, 108-2, . . . 108-L that provide sensor data to the burst buffer appliance 102. The burst buffer appliance 102 is therefore configured to ingest checkpoint data from the compute node 105-1 as well as sensor data from one or more of the sensor networks 108. However, it is to be appreciated that a wide variety of additional or alternative data sources may provide input data to the burst buffer appliance 102 in other embodiments. In some embodiments, one or more of the sensor networks 108 or other data sources 107 may be considered part of the supercomputer 104.

The burst buffer appliance 102 comprises a flash memory 110 that stores data that is to be delivered to the parallel file system 106 as well as data that has been retrieved from the parallel file system 106. The flash memory 110 is an example of what is more generally referred to herein as a "high-speed memory," where such a memory has a substantially lower access time for write and read operations directed thereto than write and read operations directed to the parallel file system 106. Thus, the burst buffer appliance 102 is configured to accelerate IO operations between the supercomputer 104 and the parallel file system 106 by storing associated data in the flash memory 110.

For example, the burst buffer appliance 102 in the present embodiment enhances the throughput performance of the information processing system 100 by supporting fast checkpointing of one or more compute nodes of the supercomputer 105. More particularly, one or more of the compute nodes 105 can write checkpoint data to the flash memory 110 at very high speeds, and that checkpoint data is later written at a much slower rate from the flash memory to the parallel file system 106. This ensures that other operations of the one or more compute nodes 105 are not unduly delayed by the writing of checkpoint data while also allowing the system 100 to continue to utilize the parallel file system 106.

As previously indicated herein, conventional arrangements are problematic in that it can be difficult to ensure that the desired checkpoints are properly written to the file system in a manner that does not cause undue interference with the other types of IO operations directed to that system. Also, conflicting priorities among the different types of IO operations can cause checkpoints to be dropped before being written to the file system, leading to problems in failure recovery.

The burst buffer appliance 102 in the present embodiment is configured to overcome these and other drawbacks of conventional practice by the incorporation of multiple virtual machines 112 that facilitate prioritization of checkpoints as well as coordination of priorities for other types of IO operations that involve utilization of the flash memory 110. More particularly, the burst buffer appliance 102 as shown comprises four distinct virtual machines 112-1, 112-2, 112-3 and 112-4, also denoted as VM1, VM2, VM3 and VM4, respectively. Each of the virtual machines VM1 through VM4 is configured for processing respective different types of IO operations that involve utilization of the flash memory 110. Moreover, each of the virtual machines VM1 through VM4 provides a different performance level for its associated type of IO operations.

The performance levels provided by the plurality of virtual machines in the present embodiment comprise respective different QoS levels for the respective different types of IO operations, with the QoS levels being specified in terms of parameters such as latency and throughput rate. Thus, for example, at least one of the QoS levels provided by a corresponding one of the virtual machines VM1 though VM4 is characterized by at least one of a specified latency and a specified throughput rate for processing the associated type of IO operations utilizing the flash memory 110.

In the present embodiment, the highest QoS level is provided by virtual machine VM1 for priority writes of checkpoint data from the compute node 105-1 into the flash memory 110, while lower QoS levels are provided for other types of IO operations involving use of the flash memory 110, including operations involving writing sensor data from the sensor networks 108 to the flash memory 110, operations involving writing or reading data to or from an analytic engine 114, and operations involving writing data from the flash memory 110 into the parallel file system 106.

More particularly, virtual machine VM2 provides a different performance level than that of virtual machine VM1 for operations involving writing sensor data from the sensor networks 108 to the flash memory 110, virtual machine VM3 provides a different performance level than that of virtual machine VM1 for operations involving writing or reading analytic engine data to or from the flash memory 110, and virtual machine VM4 provides a different performance level than that of VM1 for operations involving writing data from the flash memory 110 to the parallel file system 106. Again, each of the different performance levels may correspond to a different QoS level.

In other embodiments, numerous other arrangements of multiple QoS levels or more generally performance levels may be provided for respective different types of IO operations that involve utilization of the flash memory 110. Also, the particular number of virtual machines implemented in the burst buffer appliance 102 may be varied, as well as the types of IO operations that are subject to virtual machine control.

Accordingly, the term "burst buffer appliance" as used herein is intended to be broadly construed, so as to encompass any network appliance or other arrangement of hardware and associated software or firmware that collective provides a high-speed memory and two or more virtual machines that control access to that high-speed memory for distinct types of IO operations. Thus, such an appliance includes a high-speed memory that may be viewed as serving as a buffer between a computer system such as supercomputer 104 and a file system such as parallel file system 106, for storing bursts of data associated with different types of JO operations.

The burst buffer appliance 102, supercomputer 104 and parallel file system 106 may communicate with one another over one or more networks such as, for example, a global computer network such as the Internet, a wide area network (WAN), a local area network (LAN), a satellite network, a telephone or cable network, a cellular network, a wireless network such as WiFi or WiMAX, or various portions or combinations of these and other types of communication networks.

At least portions of the burst buffer appliance 102, supercomputer 104 and parallel file system 106 may be implemented using one or more processing platforms, examples of which will be described in greater detail below in conjunction with FIGS. 3 and 4. A given such processing platform comprises at least one processing device comprising a processor coupled to a memory, and the processing device may be implemented at least in part utilizing one or more virtual machines.

Although shown in FIG. 1 as being separate from the supercomputer 104 and parallel file system 106, the burst buffer appliance 102 in other embodiments may be implemented at least in part within one or more of these system elements. It is also to be appreciated that a given embodiment of the information processing system 100 may include multiple instances of one or more of the burst buffer appliance 102, supercomputer 104 and parallel file system 106, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in greater detail with reference to the flow diagram of FIG. 2. The process as shown includes steps 200 through 204.

In step 200, a given burst buffer appliance 102 coupled between supercomputer 104 and parallel file system 106 is configured to include a high-speed memory having a substantially lower access time than the parallel file system. In the present embodiment, the high-speed memory is assumed to comprise flash memory 110, but other types of low-latency memory could be used. Typically, such low-latency memories comprise electronic memories, which may be implemented using non-volatile memories, volatile memories or combinations of non-volatile and volatile memories.

In step 202, the burst buffer appliance 102 is configured to include a plurality of virtual machines for processing respective different types of IO operations that involve utilization of the high-speed memory, such that each of the virtual machines provides a different performance level for its associated type of JO operations.

In step 204, the various types of IO operations are processed using the configured virtual machines to control utilization of the high-speed memory.

In the particular configuration illustrated in FIG. 1, the configuring of the burst buffer appliance 102 includes configuring that appliance to include the flash memory 110 and the four virtual machines VM1, VM2, VM3 and VM4.

As noted above, VM1 is configured with the highest QoS level so as to ensure that priority writes of checkpoint data from one or more of the compute nodes 105 to the flash memory 110 are performed at the highest possible speed. This ensures that the checkpointing process causes the least possible interruption in the usual computations performed by the one or more compute nodes 105.

After the checkpoint data has been written to the flash memory 110 at high priority under the control of VM1, it can be written at a much slower rate and lower priority from the flash memory to the parallel file system 106 under the control of VM4. This is because the one or more compute nodes 105 for which checkpoints were taken have at this point already returned to performing their usual computations, and so are no longer waiting for completion of the checkpoint data write operation.

The other two virtual machines VM2 and VM3 also have priorities that are lower than that of the first virtual machine VM1. VM2 controls the writing of sensor data from the sensor networks 108 to the flash memory 110. VM3 implements analytics engine 114 that both writes to and reads from the flash memory 110, but at lower priority than either VM2 or VM4, in order to perform historical analysis of data and other types of analytics relating to data stored in parallel file system 106. Each of the virtual machines may be configured to provide other desirable properties for their associated type of IO operations. For example, VM2 may provide low-latency writes of sensor data, while VM4 is configured to execute priority reads of the flash memory 110.

Absent the use of separate virtual machines to set QoS levels or other performance levels for these different types of JO operations that utilize the flash memory 110, lower priority JO operations such as those associated with sensor data from sensor networks 108 or analytic data from analytic engine 114 might unduly interfere with the efficient writing of checkpoint data from the compute nodes, thereby slowing down the operation of the supercomputer 104.

Figure 2:
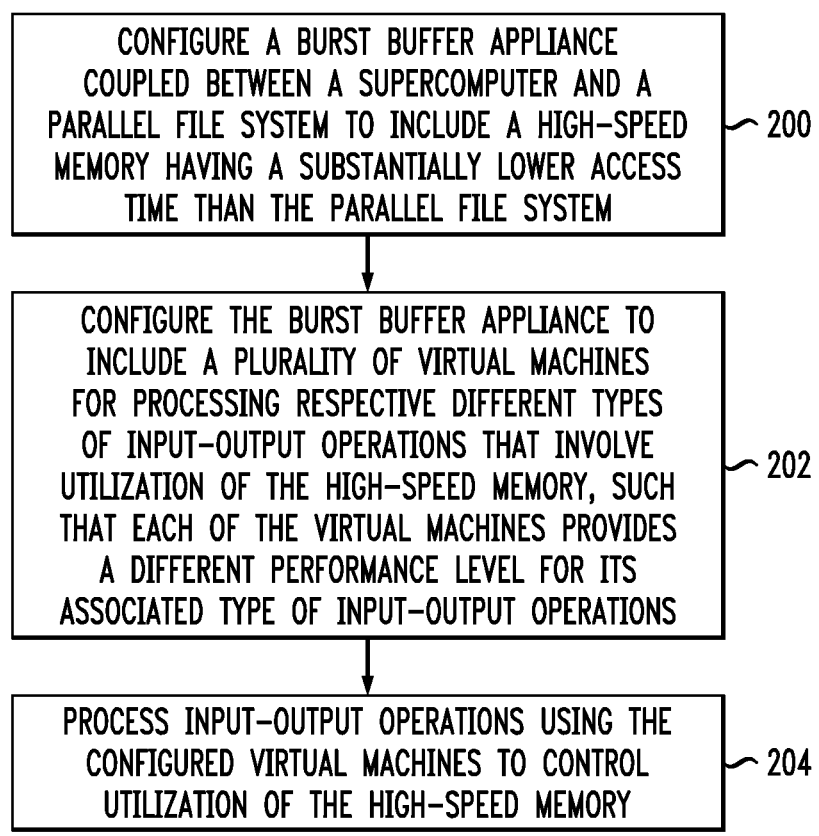
FIG. 2 is a flow diagram illustrating the operation of the virtual machine based burst buffer appliance of FIG. 1.

Accordingly, the configuring steps 200 and 202 of the FIG. 2 flow diagram may be viewed as establishing different virtual machines for enforcing different QoS levels for respective data streams associated with different types of JO operations that utilize the flash memory 110. Such configuring steps may be performed at least in part by one or more hypervisors of a processing platform that implements at least a portion of the burst buffer appliance 102.

As indicated previously, different levels of QoS may be based on parameters such as latency and throughput rate, and may be achieved by configuring the corresponding virtual machines to include appropriate numbers of processing cores and other computational and storage resources. Also, this arrangement allows data associated with certain types of processing operations to be cached in a memory of the virtual machine, thereby reducing the number of writes to the flash memory. This can advantageously increase the lifetime of the flash memory, as a flash memory typically has only a limited write endurance and can therefore support only a finite number of write operations over its lifetime.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing a virtual machine based burst buffer appliance in system 100. For example, the ordering of the process steps may be varied in other embodiments, or certain steps may be performed concurrently with one another rather than serially. Also, one or more of the process steps may be repeated periodically for different processing applications, or performed in parallel for multiple instances of the burst buffer appliance supporting multiple processing applications.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having such program code embodied therein is an example of what is more generally referred to herein as a "computer program product."

It was noted above that portions of the information processing system 100 may be implemented using one or more processing platforms. Illustrative embodiments of such platforms will now be described in greater detail.

Figure 3:
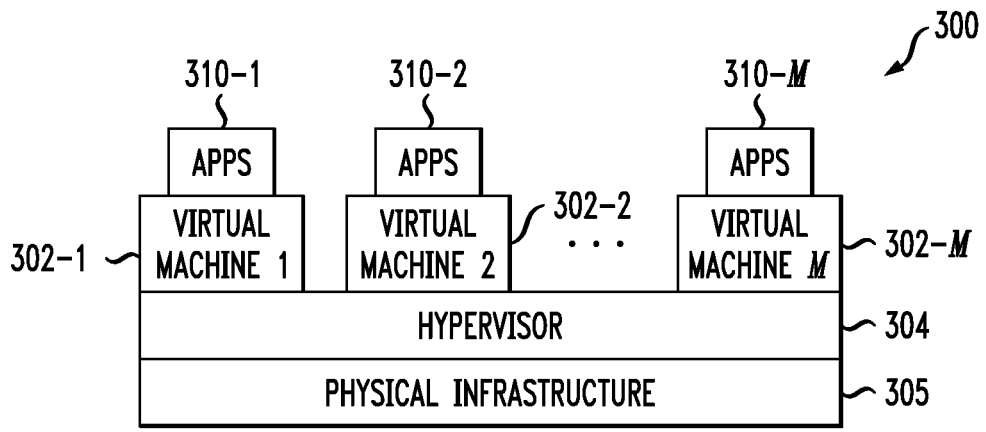
FIGS. 3 and 4 show examples of processing platforms that may be utilized to implement at least a portion of the information processing system of FIG. 1.
Figure 4:
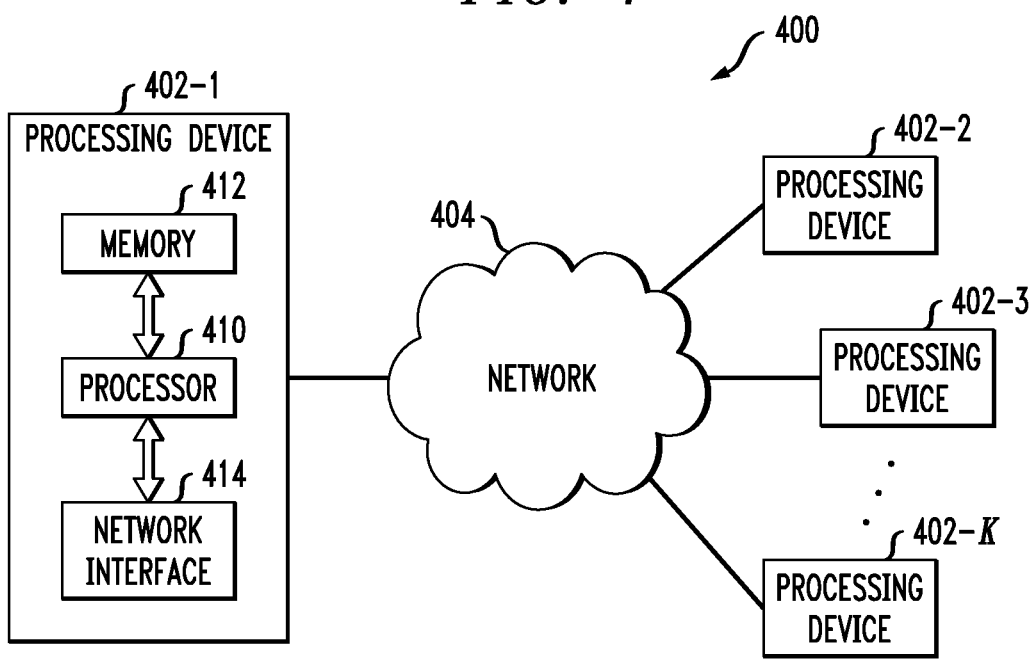

As shown in FIG. 3, portions of the information processing system 100 may comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 may of course include multiple hypervisors each providing a set of virtual machines using at least one underlying physical machine. Different sets of virtual machines provided by one or more hypervisors may be utilized in configuring multiple instances of the burst buffer appliance 102.

An example of a commercially available hypervisor platform that may be used to implement hypervisor 304 and possibly other portions of the information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 and includes a plurality of processing devices, denoted 402-1, 402-2, 402-3, . . . 402-K, which communicate with one another over a network 404.

The network 404 may comprise any type of network, including by way of example a global computer network such as the Internet, a WAN, a LAN, a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "computer program product" having executable computer program code embodied therein, may comprise random access memory (RAM), read-only memory (ROM) or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a burst buffer appliance as disclosed herein can be implemented at least in part in the form of one or more software programs stored in memory and executed by a processor of a processing device such as one of the virtual machines 302 or one of the processing devices 402. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, the disclosed techniques are applicable to a wide variety of other types of information processing systems, computer systems and file systems that can benefit from acceleration of IO operations using a virtual machine based burst buffer appliance as described herein. Also, the particular configurations of system and device elements shown in FIGS. 1, 3 and 4, and the processing operations shown in FIG. 2, can be varied in other embodiments. Thus, for example, the number of virtual machines utilized in a given burst buffer appliance and their respective performance levels may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a burst buffer appliance adapted for coupling between a computer system and a file system;
the burst buffer appliance comprising a high-speed memory having a substantially lower access time than the file system;
the burst buffer appliance being configured to include a plurality of virtual machines for processing respective different types of input-output operations that involve utilization of the high-speed memory;

wherein each of the virtual machines provides a different performance level for its associated type of input-output operations;
wherein the plurality of virtual machines comprises:
a first virtual machine for processing a first type of input-output operations that involve utilization of the high-speed memory; and
at least a second virtual machine for processing at least a second type of input-output operations that involve utilization of the high-speed memory;
wherein the first type of input-output operations is associated with a first priority and the second type of input-output operations is associated with a second priority lower than the first priority;
wherein the first type of input-output operations comprises operations involving writing checkpoints from the computer system to the high-speed memory; and
wherein the second type of input-output operations comprises operations involving at least one of: writing sensor data from a sensor network to the high-speed memory; writing or reading analytic engine data to or from the high-speed memory; and writing from the high-speed memory to the file system.

2. The apparatus of claim 1 wherein the computer system comprises a super computer having a plurality of compute nodes and the burst buffer appliance is adapted for coupling between at least one of the compute nodes and the file system.

3. The apparatus of claim 1 wherein the file system comprises a cluster file system comprising one of a parallel file system and a distributed file system.

4. The apparatus of claim 1 wherein the high-speed memory comprises a flash memory.

5. The apparatus of claim 1 wherein the performance levels provided by the plurality of virtual machines comprise respective different quality of service (QoS) levels for the respective different types of input-output operations.

6. The apparatus of claim 1 wherein the performance level provided by a given one of the virtual machines is characterized by at least one of a specified latency and a specified throughput rate for processing the associated type of input-output operations utilizing the high-speed memory.

7. The apparatus of claim 1 wherein the first virtual machine provides a first performance level for operations involving writing checkpoints from the computer system to the high-speed memory.

8. The apparatus of claim 7 wherein the first performance level comprises a highest QoS level of a plurality of QoS levels corresponding to the respective performance levels provided by the respective virtual machines of the plurality of virtual machines.

9. The apparatus of claim 7 wherein the second virtual machine provides a different performance level than the first performance level for operations involving writing sensor data from a sensor network to the high-speed memory.

10. The apparatus of claim 7 wherein the second virtual machine provides a different performance level than the first performance level for operations involving writing or reading analytic engine data to or from the high-speed memory.

11. The apparatus of claim 7 wherein the second virtual machine provides a different performance level than the first performance level for operations involving writing from the high-speed memory to the file system.

12. A processing platform that incorporates the apparatus of claim 1.

13. A method comprising:
configuring a burst buffer appliance adapted for coupling between a computer system and a file system to include a high-speed memory having a substantially lower access time than the file system; and
configuring the burst buffer appliance to include a plurality of virtual machines for processing respective different types of input-output operations that involve utilization of the high-speed memory;
wherein each of the virtual machines provides a different performance level for its associated type of input-output operations;
wherein the plurality of virtual machines comprises:
a first virtual machine for processing a first type of input-output operations that involve utilization of the high-speed memory; and
at least a second virtual machine for processing at least a second type of input-output operations that involve utilization of the high-speed memory;
wherein the first type of input-output operations is associated with a first priority and the second type of input-output operations is associated with a second priority lower than the first priority;
wherein the first type of input-output operations comprises operations involving writing checkpoints from the computer system to the high-speed memory; and
wherein the second type of input-output operations comprises operations involving at least one of: writing sensor data from a sensor network to the high-speed memory; writing or reading analytic engine data to or from the high-speed memory; and writing from the high-speed memory to the file system.

14. The method of claim 13 wherein configuring the burst buffer appliance to include a plurality of virtual machines comprises configuring the first virtual machine to provide a first performance level for operations involving writing checkpoints from the computer system to the high-speed memory.

15. The method of claim 14 wherein configuring the burst buffer appliance to include a plurality of virtual machines comprises configuring the second virtual machine to provide a different performance level than the first performance level for operations involving writing sensor data from a sensor network to the high-speed memory.

16. The method of claim 14 wherein configuring the burst buffer appliance to include a plurality of virtual machines comprises configuring the second virtual machine to provide a different performance level than the first performance level for operations involving writing or reading analytic engine data to or from the high-speed memory.

17. The method of claim 14 wherein configuring the burst buffer appliance to include a plurality of virtual machines comprises configuring the second virtual machine to provide a different performance level than the first performance level for operations involving writing from the high-speed memory to the file system.

18. A computer program product comprising a processor-readable storage medium having encoded therein executable code of one or more software programs, wherein the one or more software programs when executed cause the server to perform the steps of the method of claim 13.

19. An information processing system comprising:
a computer system;
a file system; and
a burst buffer appliance coupled between the computer system and the file system, the burst buffer appliance comprising:
a high-speed memory having a substantially lower access time than the file system; and a plurality of virtual machines for processing respective different types of input-output operations that involve utilization of the high-speed memory;

wherein each of the virtual machines provides a different performance level for its associated type of input-output operations;

wherein the plurality of virtual machines comprises:
   a first virtual machine for processing a first type of input-output operations that involve utilization of the high-speed memory; and
   at least a second virtual machine for processing at least a second type of input-output operations that involve utilization of the high-speed memory;

wherein the first type of input-output operations is associated with a first priority and the second type of input-output operations is associated with a second priority lower than the first priority;

wherein the first type of input-output operations comprises operations involving writing checkpoints from the computer system to the high-speed memory; and wherein the second type of input-output operations comprises operations involving at least one of: writing sensor data from a sensor network to the high-speed memory; writing or reading analytic engine data to or from the high-speed memory; and writing from the high-speed memory to the file system.

20. The system of claim 19 wherein the computer system comprises a super computer having a plurality of compute nodes and the burst buffer appliance is coupled between at least one of the compute nodes and the file system.

21. The system of claim 19 wherein the file system comprises a cluster file system comprising one of a parallel file system and a distributed file system.

* * * * *